United States Patent [19]
Perry

[11] 3,734,374
[45] May 22, 1973

[54] GUIDE ASSEMBLY
[75] Inventor: Cooper Perry, Roanoke, Ala.
[73] Assignee: Batson-Cook Company, West Point, Ga.
[22] Filed: Jan. 17, 1972
[21] Appl. No.: 218,381

[52] U.S. Cl. ............................. 226/199, 242/157 R
[51] Int. Cl. ............................................. B65h 23/32
[58] Field of Search ...................... 226/196, 198, 199; 242/157 R

[56] References Cited

UNITED STATES PATENTS

| 1,543,139 | 6/1925 | Whipple | 242/157 R |
| 3,266,692 | 8/1966 | Whitten | 226/199 X |
| 2,202,937 | 6/1940 | Wolfe | 242/157 R |

FOREIGN PATENTS OR APPLICATIONS

| 591,775 | 8/1947 | Great Britain | 242/157 R |

*Primary Examiner*—Allen N. Knowles
*Attorney*—Edward Taylor Newton, George M. Hopkins, William J. Ormsby et al.

[57] ABSTRACT

An assembly for use in guding continuous lengths of material, the assembly being constructed of a plurality of guide members, each having an integrally formed body defining oppositely directed material guiding notches. The guide members are constructed so that the two oppositely directed notches are located in spaced parallel planes, and detailed in location relative to each other when assembled whereby one material guiding notch of one guide member is coaxially aligned with an oppositely directed material guiding notch of an adjacent guide member to define a material guiding passageway. The two aligned notches are axially spaced relative to each other to define a material threading passageway which communicates with and is angularly disposed relative to the material guiding passageway to permit a length of material to be inserted into or removed from the material guiding passageway. The guide members also include formed surfaces adapted to interlock with complementary surfaces on adjacent guide members whdn uupported in an assembled juxtapositioned relationship with each other. A channel-shaped support member is provided for supporting the guide members in transverse alignment and in juxtaposition relative to each other so that the formed surfaces are in interlocking relationship. Spacer means is operatively associated with the channel-shaped support member so that the guide members can be transversely adjusted to a selected set position and can be spaced relative to each other to permit selected guide members to be independently added or removed.

19 Claims, 5 Drawing Figures

Patented May 22, 1973   3,734,374

GUIDE ASSEMBLY

BACKGROUND OF THE INVENTION

This invention relates to apparatus for use in guiding continuous lengths of material, such as thread or yarn, processed in a textile manufacturing operation.

One such apparatus used for guiding a plurality of lengths of material is disclosed to the U.S. Pat. to Carroll, No. 3,520,493, issued July 14, 1970. In the Carroll disclosure, a plurality of strands of material are guided from a plurality of yarn package elements supported on a creel. The strands of material are threaded through the guide assembly and thereafter wound on a warp or beam which is utilized in a further textile manufacturing operation, such as the weaving of cloth on a loom. The individual guide members utilized for guiding a length of material in the Carroll patent requires independent mounting bolts for securing the guide members in a selectively set position. Further, the individual guide members are constructed so that the thread or length of material must be angularly adjusted in a vertical plane in a material threading operation in which angular adjustment is difficult when attempting to thread a guide member located adjacent other guide members which have been previously threaded.

Another guide assembly is disclosed in the U.S. Pat. to Roeder et al., No. 3,277,537, issued Oct. 11, 1966. The Roeder et al. guide assembly includes a plurality of guide elements which are adapted to be assembled in transverse alignment by utilizing interconnecting support shafts and complementary openings. The guide assembly of Roeder et al. must be completely disassembled in order to remove or replace individual guide elements. Further, the Roeder et al. guide assembly does not include a material guiding passageway which will hold thread or yarn against radial displacement relative to the longitudinal guiding axis.

A further prior art guide assembly is disclosed in the U.S. Pat. to Fedevich, No. 3,203,387, issued Aug. 31, 1965. The Fedevich guide assembly utilizes an integrally formed plastic element having a plurality of fingers which define material guiding passageways therebetween. The guiding apparatus of Fedevich does not permit transverse adjustment of the guiding passageways and does not permit the build up of an assembly having a selected number of material guiding passageways. Further, should one of the fingers defining the material guiding passageways of Fedevich become broken, the entire assembly must be replaced.

An independent guide element constructed to define a material guiding passageway having an angularly disposed material threading passageway is disclosed in the U.S. Pat. to Wolfe, No. 2,202,937, issued June 4, 1940. However, the guide element of Wolfe does not have formed interlocking surfaces and supporting means for supporting a plurality of the guide members in juxtaposition relative to each other to define an assembly having a plurality of material guiding passageways.

SUMMARY OF THE INVENTION

The above disadvantages of the prior art have been overcome by the present invention which basically includes a plurality of integrally formed guide members, with each guide member having a pair of oppositely directed material guiding notches which are located in spaced parallel planes and wherein the material guide members are adapted to be supported in transverse alignment and juxtapositioned relative to each other so that oppositely directed material guiding notches of adjacent guide members are axially aligned with each other to define a material guiding passageway having a radially extending and angularly disposed material threading passageway.

One important feature of the present invention is the provision of a channel-shaped support means for supporting a plurality of the guide members in transverse alignment to form a guide assembly which permits transverse adjustment of the material guiding passageway and which permits independent removal or addition of material guide members.

The support means and guide members of the present invention permit a guide assembly to be constructed having a selected number of material guiding passageways and permit adjustment of the material guiding passageway to accommodate various requirements in a material guiding operation.

It is therefore a primary object of the present invention to provide a guide assembly which defines a plurality of material guiding passageways, with each passageway having a material threading passageway.

A further object of the present invention is to provide a guide assembly which will permit replacement of independent guide members.

Another object of the present invention is to provide a guide assembly which will permit transverse adjustment of the material guiding passageway relative to the material guiding axis.

A still further object of the present invention is to provide a guide assembly which can be constructed to provide a predetermined number of material guiding passageways.

Yet another object of the present invention is to provide a support means for supporting a plurality of guide members in transverse alignment and in juxtaposition relative to each other.

A further object of the present invention is to provide an integrally formed guide member having a pair of material guiding notches and formed interlocking surfaces which can be aligned with an adjacent guide member to define a material guiding passageway having a material threading passageway therebetween.

An additional object of the present invention is to provide a guide assembly which is simple in construction and operation, economical to manufacture and reliable in performance.

Still other objects and advantages of the details of construction will become apparent after reading the following description of the illustrative embodiment, with reference to the attached drawing, wherein like reference numerals have been used to refer to like parts throughout the several figures, and wherein:

DESCRIPTION OF THE ILLUSTRATIVE EMBODIMENT

Figures 1, 2:
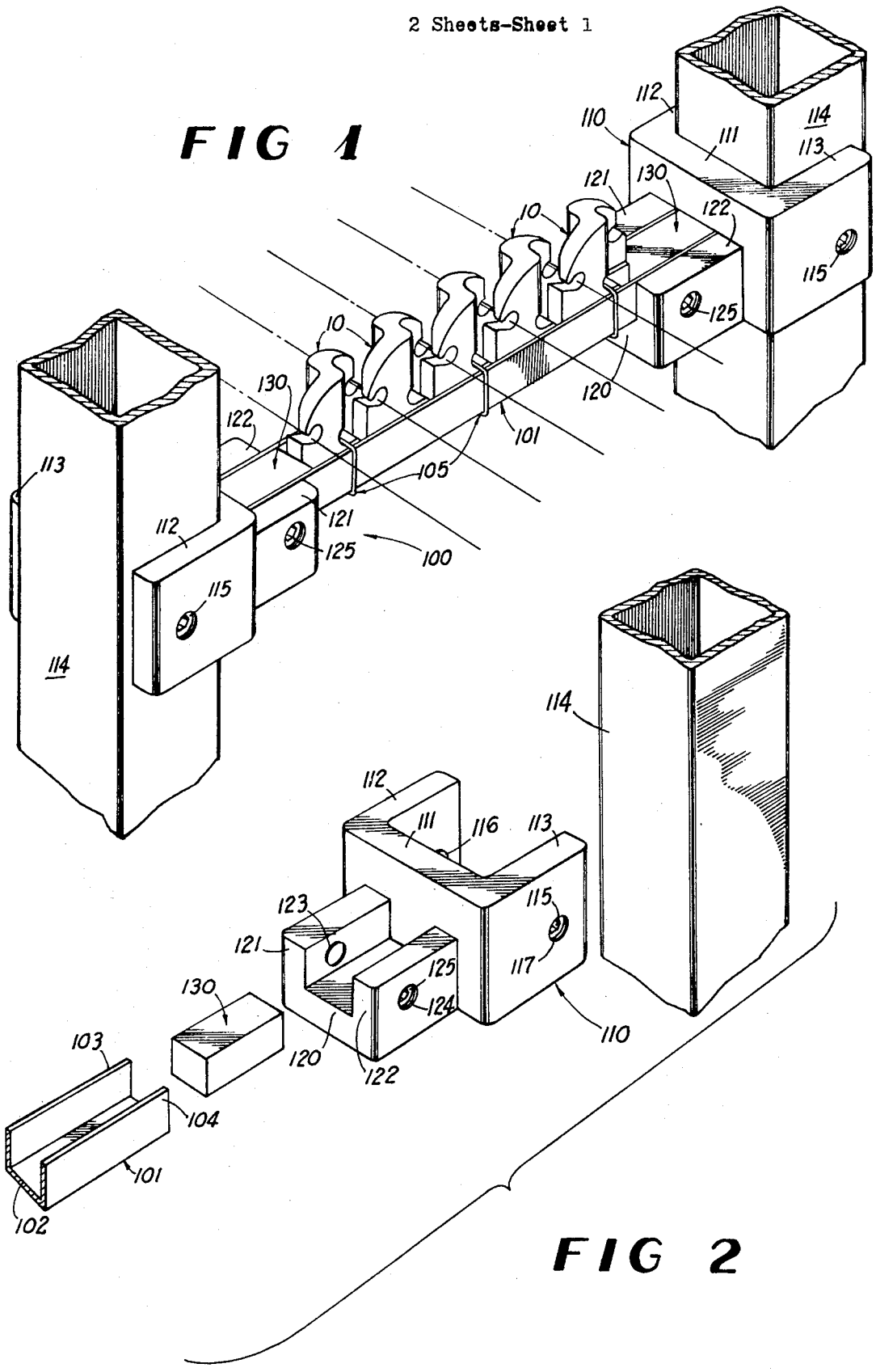
FIG. 1 is a perspective view of a guide assembly embodying the principles of the present invention.
FIG. 2 is an enlarged fragmentary exploded perspective view showing one end of the support means for the guide assembly.

Referring now to the drawings, the guide assembly embodying the principles of the present invention will be described with reference to a plurality of guide members generally represented by the reference numeral 10 and support means for supporting a plurality of the guide members 10 in transverse alignment, the support means being generally represented by the reference numeral 100.

Figure 3:
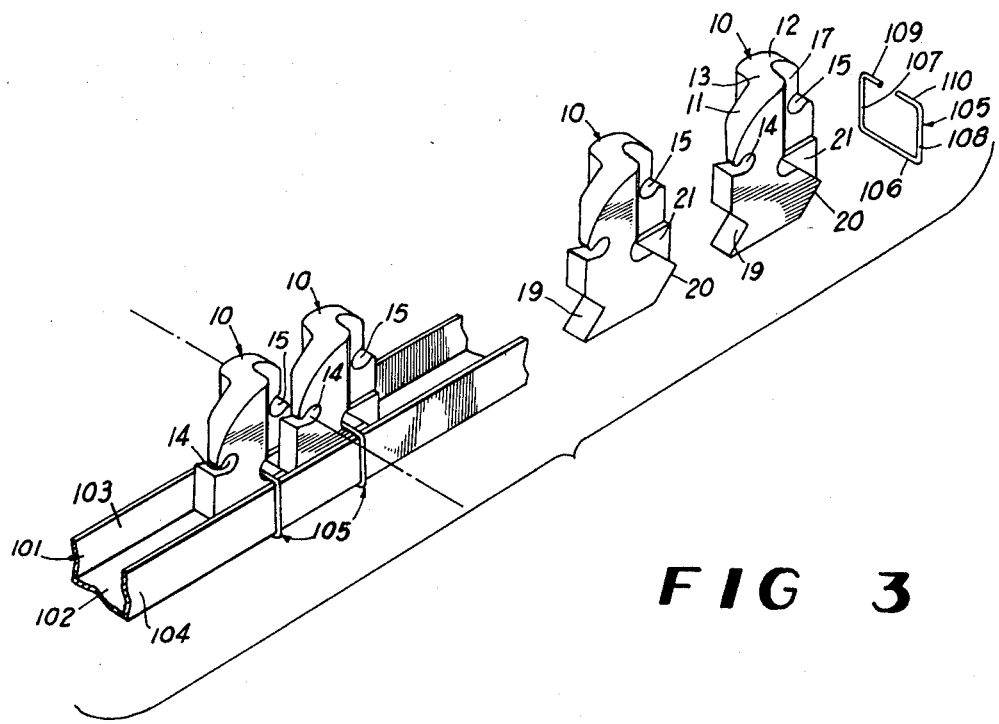
FIG. 3 is a fragmentary exploded perspective view of the support means and guide members.
Figure 4:
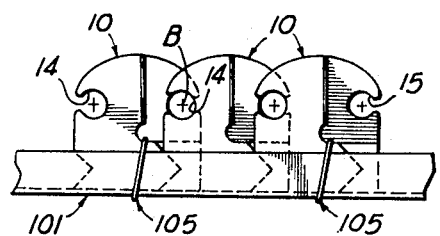
FIG. 4 is a fragmentary front elevational view of the guide assembly shown in FIG. 1; and, FIG. 5 is a top plan view of FIG. 4.

As shown in FIGS. 1 and 3–5, each of the guide members 10 is constructed to include an integral body portion formed of suitable plastic or other synthetic material. Each of the integrally formed guide members 10 includes a pair of upstanding wall structures 11, 12 which are joined by an intermediate cross wall 13. Walls 11, 12 are arranged parallel relative to each other and are horizontally spaced by the dimension of the cross wall 13, as shown in FIG. 4. Walls 11, 12 are each provided with an outwardly projecting material guiding notch 14, 15, respectively. Notches 14, 15 define a material guiding axis which is substantially perpendicular to the plane of the sidewalls and is provided with an entrance opening to permit a thread to be readily inserted and removed therefrom. To facilitate the inserting and removing of a thread in a threading operation, the walls 11, 12 are provided with angled surfaces 16, 17, respectively. The angled surfaces 16, 17 are arranged substantially parallel to each other with each surface extending radially outward from the material guiding axis formed by the notches and with the surfaces communicating with the notches 14, 15. As shown in FIG. 3, wall 11 is provided with a first surface formed as V-shaped recess 19 and a second oppositely directed surface formed as V-shaped projection 20. Projection 20 is complementary to V-shaped recess 19. The V-shaped recess 19 and V-shaped projection 20 are detailed for receiving complementary projections and notches, respectively, when supported in an assembled relationship adjacent other guide members. A formed spacer surface 21 is provided on wall 12 and extends horizontally outward therefrom in the direction of the V-shaped projection 20 a distance to accurately space the wall 11 relative thereto in an assembled relationship.

As shown in FIGS. 1 and 3–5, when the material guide members 10 are supported in an assembled relationship in transverse alignment and juxtapositioned relative to each other, the V-shaped projection 20 of one guide member will be received by the complementary V-shaped recess 19 of an adjacent guide member to provide an interlocking engagement which will control relative displacement of the guide members.

When the guide members 10 are supported in assembled and interlocked relationship, the material guiding notch 14 of one guide member will be coaxially aligned with a material guiding notch 15 of an adjacent guide member to define a material guiding passageway. The material guiding passageway is disposed at substantially right angles to the transverse alignment of a plurality of assembled guide members. In an assembled relationship, the angular threading surface 16 of one guide member is aligned with an angled threaded surface 17 of an adjacent guide member to define a material threading passageway which is angularly disposed and communicates with the material guiding passageway to permit a length of material to be readily inserted and removed therefrom.

As shown in FIGS. 1 and 2–5, the guide members 10 are supported in an assembled relationship by means of a support means generally represented by the reference numeral 100. The support means 100 includes a channel-shaped support member 101 having a base 102 and a pair of parallel arranged upstanding sidewalls 103, 104. The dimension between sidewalls 103, 104 is detailed to be complementary to the outside dimension between walls 11, 12 of a guide member, as shown in FIG. 4 to confine the guide members against lateral displacement. The channel-shaped support member 101 provides means for retaining the guide members and for preventing relative displacement in three directions. The guide members are retained for movement in a fourth direction by a plurality of wire retaining clips 105. The wire retaining clips 105 include a base 106 and a pair of upstanding legs 107, 108. The upper ends of legs 107, 108 include inwardly directed retaining portions 109, 110. The clip base and leg portions 106–108 are detailed in dimension to surround the channel-shaped member 101 to permit the inwardly directed legs 109, 110 to pass over the upper edges of the channel-shaped sides and extend inwardly an amount sufficient to engage and retain the guide members in an assembled relationship.

As shown in FIGS. 1 and 2, opposite ends of the channel-shaped support member 101 are supported by an attachment bracket generally represented by the reference numeral 110. The attachment bracket 110 is integrally formed of suitable plastic or other synthetic material and includes a base 111 having a pair of parallel, outwardly extending legs 112, 113. The base 111 and legs 112, 113 are detailed to provide a passageway for receiving a framework support member 114. THe attachment bracket will permit vertical adjustment of the guide assembly relative to the frame member 114, with the attachment bracket being secured in a selected adjusted position by means of a conventional set screw locking means 115 which is threadably received by a pair of openings 116, 117 formed in legs 112, 113, respectively.

As shown in FIGS. 1 and 2, the attachment bracket 110 includes a channel-shaped horizontal projection having a base portion 120 and a pair of parallel upstanding sidewalls 121, 122. Sidewalls 121, 122 are provided with internally threaded openings 123, 124, respectively, which are adapted to receive conventional set screw locking means 125. The dimension between sidewalls 121, 122 is detailed to be complementary to the outside dimension of the sidewalls 103, 104 of the channel-shaped member 101. In an assembled relationship, opposite ends of the channel-shaped support member 101 are received within the channel-shaped projections 120–122 and are secured in a set position relative thereto by the set screw locking means 125.

As shown in FIGS. 1 and 2, the guide members 10 are restrained from transverse movement within the channel-support member 101 by means of a pair of spacer elements 130. The spacer elements 130 are detailed in dimensions to fit within the channel-shaped support member 101, as shown in FIG. 1, so that the set screw means 125 will bias the sidewalls 103, 104 inwardly to frictionally hold the spacer elements 130. Spacer elements 130 can be varied in longitudinal dimension to alter the number of guide members 10 carried by the channel-shaped support member and to provide transverse adjustment of the guide members relative to the material guiding axis.

A guide member 10 can be removed and added to the channel-shaped support member 101 by adjusting the set screw means 125, removing a spacer element 130, effecting a transverse spacing of the guide members within the channel, and vertically lifting the desired guide member from the channel. Prior to transversely adjusting the guide members, the retaining clips 105 should be removed. The number of guide members supported by the channel can be increased or decreased by addingg different length spacer elements 130 to maintain the guide members in a transversely set position.

Figure 5:
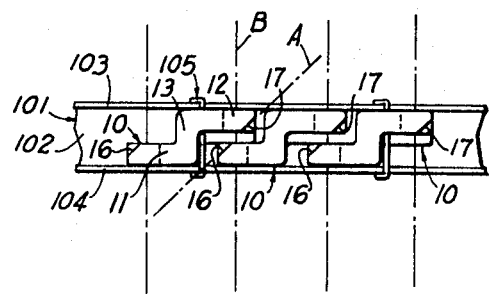

With the guide assembly supported in an assembled relationship as shown in FIG. 1, the threads or strands of material to be guided can be easily moved into position by adjusting the thread or strand to an angle as shown by a line generally represented by the letter A (FIG. 5), moving the thread or strand radially inward through the threading passageway formed between the axially spaced notches 14, 15 and thereafter moving the thread or strand to a longitudinally aligned position coaxial with the guiding passageway, which is generally represented by the letter B (FIG. 5).

It is apparent that should one of the guide members 10 become damaged or broken during operation, the individual guide member could be removed and replaced as indicated hereinabove. Further, the guide assembly embodying the principles of the present invention will permit vertical adjustment of the guide assembly relative to the supporting frame members 114 by adjusting the set screw means 115, moving the assembly to a desired position and again adjusting the set screw means to a locked position. The guide members 10 can be transversely adjusted relative to the material guiding passageways by changing the dimensions of the spacer elements 130 supported within the opposite ends of the channel-shaped member 101.

It now becomes apparent that the above described illustrative embodiment of a guide assembly is capable of obtaining the above stated objects and advantages. It is obvious that those skilled in the art may make modifications in the details of construction without departing from the spirit of the invention which is to be limited only by the scope of the appended claims.

What is claimed is:

1. An assembly for use in guiding continuous lengths of material comprising, in combination:
   a. a material guide member having oppositely directed material guiding notches;
   b. means for supporting at least two of said guide members in juxtaposition relative to each other so that one material guiding notch of one of said guide members is axially aligned with an oppositely directed material guiding notch of said other guide member to define a material guiding passageway, and wherein said aligned notches are axially spaced relative to each other to define a material threading passageway which communicates with and is angularly disposed relative to said material guiding passageway, said material guide members including formed surfaces adapted to interlock with complementary surfaces on adjacent juxtapositioned guide members.

2. An assembly as defined in claim 1 further characterized in that said formed surfaces are detailed to prevent relative displacement of interlocked guide members in at least one direction.

3. An assembly as defined in claim 2 further characterized in that said formed surfaces on each of said guide members include a V-shaped notch extending in one direction and a V-shaped projection extending in an opposite direction, and wherein said V-shaped notches and V-shaped projections are adapted to interlock with complementary V-shaped notches and projections, respectively, on adjacent juxtapositioned guide members.

4. An improved guide member for use in an assembly capable of guiding continuous lengths of material, said improved guide member including a body having oppositely directed material guiding notches, said notches being located in spaced parallel planes, and wherein said body includes formed surfaces adapted to interlock with complementary surfaces on adjacent guide members when supported in an assembled juxtaposition relationship with each other.

5. An improved guide member as defined in claim 4 further characterized in that said formed surfaces are detailed to prevent relative displacement of interlocked guide members in at least one direction.

6. An improved guide member as defined in claim 5 further characterized in that said formed surfaces include a V-shaped notch extending in one direction and a V-shaped projection extending in an opposite direction, and wherein said V-shaped notches and V-shaped projections are adapted to interlock with complementary V-shaped notches and projections, respectively, on adjacent juxtapositioned guide members.

7. An improved guide member as defined in claim 4 further characterized in that each of said material guiding notches formed on said material guide member includes a retaining shoulder extending over one side of said notch, said shoulders being provided with an angularly formed surface which extends radially inward and communicates with said material guiding notch, wherein said angularly formed surface of one shoulder is parallel to said other angularly formed shoulder surface.

8. An assembly for use in guiding continuous lengths of material comprising, in combination:
   a. a guide member having a passageway for guiding continuous lengths of material therethrough, said guide member including formed surfaces adapted to interlock with complementary surfaces on adjacent guide members when supported in an assembled juxtaposition relative thereto; and,
   b. means for supporting a plurality of said guide members in an assembled position in juxtaposition relative to each other, with said formed surfaces in interlocking engagement to prevent relative displacement in at least one direction, and wherein said supporting means includes means for preventing relative displacement of said guide members in three additional angularly disposed directions, with said supporting means permitting longitudinal adjustment of said guide members along said supporting means to vary the spacing of said guide members so that one guide member can be displaced relative to adjacent guide members in said direction which is prevented by said interlocking means.

9. An assembly as defined in claim 8 further characterized in that said supporting means includes retaining clips surrounding said support means and including inwardly directed projections for engaging said guide members to maintain the guide members on said supporting means.

10. An assembly as defined in claim 8 further characterized in that said supporting means includes preselected spacer means detailed in dimension to maintain said plurality of guide members in a predetermined longitudinally adjusted relationship relative to said support means.

11. An assembly as defined in claim 8 further characterized in that said means for supporting said guide members in juxtaposition adjacent each other include a channel-shaped support, and wherein said guide members are carried within the channel of said support.

12. An assembly as defined in claim 11 further characterized in that said guide members are longitudinally adjustable relative to said channel and are adapted to be secured in a selectively set position by a retaining clip, said retaining clip adapted to surround said channel-shaped member and including a pair of inwardly directed retaining portions which engage a material guide member for retaining the mateiral guide member within said channel.

13. An assembly as defined in claim 11 further characterized in that said support means includes spacer means adapted to fit within said channel for maintaining said guide members in a longitudinally adjusted position.

14. An assembly as defined in claim 13 further characterized in that said support means includes a pair of attachment brackets adapted to support opposite ends of said channel-shaped support, said attachment brackets including means for securing said brackets to supporting frame means.

15. An assembly for use in guiding continuous lengths of material comprising, in combination:
 a. a material guide member having oppositely directed material guiding notches;
 b. means for supporting at least two of said guide members in juxtaposition relative to each other so that one material guiding notch of one of said guide members is axially aligned with an oppositely directed material guiding notch of said other guide member to define a material guiding passageway, and wherein said aligned notches are axially spaced relative to each other to define a material threading passageway which communicates with and is angularly disposed relative to said material guiding passageway, each of said material guiding notches formed on a material guide member including a retaining shoulder extending over one side of said notch, said shoulders being provided with an angularly formed surface which extends radially inward and communicates with said material guiding notch, wherein said angularly formed surface of one shoulder will cooperate with an angularly formed shoulder surface of a juxtapositioned guide member to define said material threading passageway.

16. An assembly for use in guiding continuous lengths of material comprising, in combination:
 a. a material guide member having oppositely directed material guiding notches;
 b. means for supporting at least two of said guide members in juxtaposition relative to each other so that one material guiding notch of one of said guide members is axially aligned with an oppositely directed material guiding notch of said other guide member to define a material guiding passageway, and wherein said aligned notches are axially spaced relative to each other to define a material threading passageway which communicates with and is angularly disposed relative to said material guiding passageway, said means for supporting said guide members in juxtaposition adjacent each other including a channel-shaped support, said guide members being carried within the channel of said support.

17. An assembly as defined in claim 16 further characterized in that said guide members are longitudinally adjustable relative to said channel and are adapted to be secured in a selectively set position by a wire retaining clip, said wire retaining clip adapted to surround said channel-shaped member and including a pair of inwardly directed retaining portions which engage a material guide member for retaining the material guide member within said channel.

18. An assembly as defined in claim 16 further characterized in that said support means includes spacer means adapted to fit within said channel for maintaining said guide members in a longitudinally adjusted position.

19. An assembly as defined in claim 18 further characterized in that said support means includes a pair of attachment brackets adapted to support opposite ends of said channel-shaped support, said attachment brackets including means for securing said brackets to supporting frame means.

* * * * *